United States Patent [19]

Lattin

[11] 3,718,915

[45] Feb. 27, 1973

[54] OPPOSITE CONDUCTIVITY GATING CIRCUIT FOR REFRESHING INFORMATION IN SEMICONDUCTOR MEMORY CELLS

[75] Inventor: William W. Lattin, Phoenix, Ariz.

[73] Assignee: Motorola, Inc., Franklin Park, Ill.

[22] Filed: June 7, 1971

[21] Appl. No.: 150,423

[52] U.S. Cl. ................340/173 R, 307/238, 307/251, 307/255, 340/173 CA

[51] Int. Cl. .......G11c 7/00, G11c 11/24, H03k 17/60

[58] Field of Search ....340/173 CA, 173 R; 307/238, 307/251, 255

[56] References Cited

UNITED STATES PATENTS

| | | | |
|---|---|---|---|
| 3,573,498 | 4/1971 | Ahrons | 307/238 |
| 3,577,166 | 5/1971 | Yung | 307/238 |
| 3,629,612 | 12/1971 | Harbert | 307/251 |
| 3,521,141 | 7/1970 | Walton | 320/1 |
| 3,535,699 | 10/1970 | Gaenssler | 340/173 |
| 3,576,571 | 4/1971 | Booher | 340/173 R |

*Primary Examiner*—Bernard Konick
*Assistant Examiner*—Stuart Hecker
*Attorney*—Mueller & Aichele

[57] ABSTRACT

Circuit for refreshing information provided as different potentials in semiconductor cells of a dynamic metal oxide semiconductor (MOS) random access memory array with greater speed and less critical clock pulse timing. The circuit is also used for reading information from the cells. The circuit may be used in a memory with a plurality of cells provided on semiconductor chip, as for example, 1,024 cells arranged in 32 rows and 32 columns, each providing one information bit. The memory may be of the dual rail type or the single rail type, and is illustrated as a dual rail memory with a DATA bus which applies potentials to the cells in each column, and a READ bus for indicating the information in the cells. The cells may include silicon gate field-effect transistors (FET) which are all of the same conductivity type, with the circuit for refreshing the information being formed by devices of complimentary types. A first pair of complimentary MOS FET's form a pair of gates selectively rendered operative by the READ bus for applying one of the two potentials which form the information bits in the cells to an interim storage point. A transmission gate applies the stored potential to the DATA bus to refresh the information potential in the cell. A single circuit restores the potentials of all the cells in a column at high speed, with low voltage operation and non-critical timing of clock pulses.

12 Claims, 2 Drawing Figures

PATENTED FEB 27 1973 3,718,915

Inventor
WILLIAM W. LATTIN
BY
Mueller & Aichele
ATTYS.

OPPOSITE CONDUCTIVITY GATING CIRCUIT FOR REFRESHING INFORMATION IN SEMICONDUCTOR MEMORY CELLS

BACKGROUND OF THE INVENTION

Semiconductor memory arrays have been produced by MOS technology, with a dynamic 1,024 bit random access memory being provided on a 150 mil square chip. The dynamic memory cells in this array each provide one bit in a matrix, which is 32 by 32. The information in each cell is stored by the charge of a capacitor formed in the semiconductor material. In order to provide this large number of cells or bits on a relatively small chip, silicon gate FET devices of the same conductivity type are used to form all of the cells of the array. That is, all of the devices used in the memory cells are either N type or P type silicon FET's. In accordance with such space saving design, the other circuitry required for the memories, such as the address, inversion, decoding, refresh and input/output circuitry, has also been constructed using devices of the same conductivity type. However, this has limited the speed of operation of the memory when operated from a low voltage supply and providing a significant noise margin.

Semiconductor chips forming dynamic random access memories constructed using silicon gate technology are capable of extremely high speeds and conduct at low threshold voltages. However, the information (charge) stored in the memory cells will gradually leak off over a period of time, and must be periodically refreshed. Accordingly, a circuit for refreshing the charges stored in the cells must be provided, such as a dynamic shift register. This requires reading out the information in each cell, and inasmuch as the information is read out through a bus which has capacitance, time is required to allow the bus to discharge to indicate the stored information. This slows the speed of operation of the memory, and this may be particularly significant as this time delay may occur during both the refresh and the read cycles.

SUMMARY OF THE INVENTION

It is an object of the present invention to provide an improved circuit for reading and/or refreshing the information in the cells of a dynamic MOS random access memory.

A further object of this invention is to provide a circuit for refreshing the information in a MOS random access memory which operates at extremely high speed, and wherein the timing of the clock pulses is relatively non-critical.

Another object of the invention is to provide a circuit for refreshing the information in the cells of a MOS random access memory which utilizes complimentary devices and which provides high speed operation from a low supply voltage.

A still further object of the invention is to provide a circuit for use in a dynamic MOS random access memory wherein information is read out at high speed by a pair of opposite conductivity FET devices to refresh the information in the memory, and/or provide information from the memory.

The refresh circuit of the invention operates with a dynamic MOS random access memory having a plurality of cells, each of which includes a capacitor for storing a potential, and with the cells including FET's which are all of the same conductivity type. The potential in each cell can be 0 or +5 volts for storing a "0" or "1" bit, respectively. To refresh the potential, and therefore the information bits in the cells, a circuit is provided including a pair of complimentary MOS FET's having gates connected to the READ bus of a column in the memory array. At the initiation of a read cycle, or of a refresh cycle, the READ bus is precharged to a potential which, in an array using N-type cells, may be a positive potential having a value of the order of 5 volts. When a cell is selected, one or the other of the complimentary FET's is rendered conducting by the charge on the READ bus, or by the discharge thereof through the cell depending on whether the cell contains a "0" or a "1." The two FET's are adapted to apply the two potentials held in the cells to provide information to an interim storage capacitor provided on the MOS structure, and are gated so that the potential corresponding to the information bit sensed by the READ bus is developed across the interim storage capacitor. The potential across the interim storage capacitor is applied through a transmission gate, which is selectively triggered, to the DATA bus which is connected to the cells in the column. The information bit from a cell can be derived from the DATA bus and used as may be desired. To refresh the information in the cell, the cell is selectively conditioned to WRITE, to apply the potential on the DATA bus to the storage capacitor of the cell. This restores the desired information bit in the cell.

The cells and the refresh circuit, as well as other circuits required by the memory array, can all be constructed on a single MOS chip, with silicon gate FET's being used for high speed operation. The capacitors required to store charges are provided by the capacitance between the gates of the FET's or other conductors and the semiconductor substrate. The refresh circuit can be used with a dual rail memory, as has been described, or with a single rail memory.

DETAILED DESCRIPTION

Figure 1:
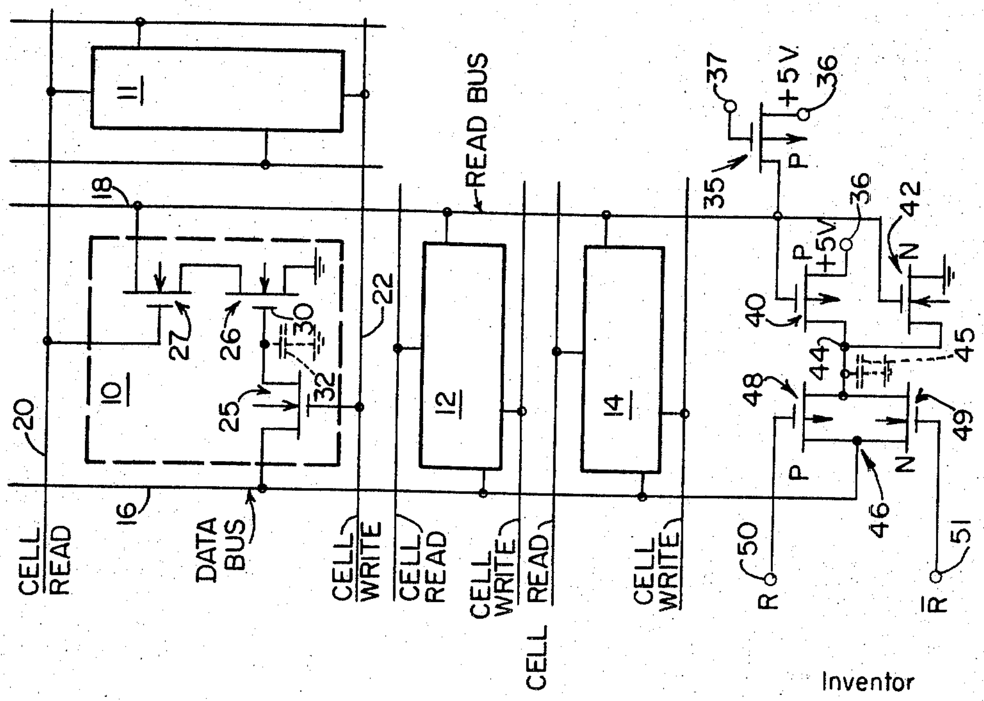
FIG. 1 shows a portion of a MOS random access memory including the circuit of the invention for refreshing the information bits stored in the cells.

Referring now to the drawing, in FIG. 1 there is shown a portion of a dynamic MOS random access memory having an array of cells arranged in rows and columns on a single semiconductor chip. Cells 10 and 11 represent two cells in the same row, and cells 10, 12 and 14 represent cells in the same column. The array may include 32 rows and 32 columns for a total of 1,024 cells, each providing one information bit. Coupled to the cells in each column is a DATA bus 16 and a READ bus 18. These are shown connected to the cells 10, 12 and 14 in the first column, and similar DATA and READ buses will be connected to the cell 11 and the other cells in each of the other columns. Connected to the cells in each row is a CELL READ line 20 and a CELL WRITE line 22. The lines 20 and 22 are shown connected to the cells 10 and 11, and will be connected to all the cells in the top row of the matrix. Similar lines will be connected to the cells 12 and 14, and the other cells in all the rows of the memory array.

Each cell may be formed by MOS FET devices and the cells may be of various known configurations. One form, which is illustrated by the cell 10, includes three N-type silicon gate FET devices which are designated 25, 26 and 27. The gate 30 of FET 26 forms a capacitor with the semiconductor substrate which stores a charge which forms the information bit of the cell 10. This capacitor is shown in dotted lines and designated by number 32. The capacitor is connected to the DATA bus 16 by the channel of FET 25, which is rendered conducting when a positive potential is applied to the CELL WRITE line 22, so that the capacitor 32 is charged to the potential on the DATA bus. In the system illustrated, the capacitor 32 may be charged to 0 volts for a "0" bit, and to +5 volts for a "1" bit.

The channels of FET's 26 and 27 are connected in series from ground to the READ bus 18. Accordingly, when a positive potential is applied to the CELL READ line 20, FET 27 is rendered conducting, and in the event that the capacitor 32 is charged to a positive potential which renders FET 26 conducting, the channels of FET's 26 and 27 will provide a series path connecting the READ bus 18 to ground. The DATA bus 16 and the READ bus 18 are both formed on the semiconductor chip and have sufficient capacity to the substrate to provide charge storage.

As previously stated, the charge on the capacitor 32 in cell 10, and similarly to charges on the capacitors of the other cells, will tend to discharge over a period of time and must be periodically refreshed so that the information bits are retained in the memory cells. To accomplish this, a circuit is provided which is connected to the DATA bus 16 and the READ bus 18 for one column of the array. Similar circuits will be connected to the DATA and READ buses for the other columns in the array.

The refresh circuit includes FET 35 which is of opposite conductivity to the FET's of the cells. With the FET's of the cells being N-type, as described, the FET 35 will be P-type. The channel of the FET 35 is connected between the positive potential terminal 36 and the READ bus 18. The gate of FET 35 is connected to terminal 37, to which a potential is applied to render FET 35 conductive at the initiation of the refresh cycle. This will cause the READ bus 18 to be precharged to the positive potential at terminal 36, which may be of the order of 5 volts.

Also connected to the READ bus 18 are the control electrodes or gates of two complimentary FET's 40 and 42. The transistor 40 is of the P-type and has the input electrode of its channel connected to the plus V potential 36, which as stated above may be 5 volts. The FET 42 is of the N-type and has the input electrode of its channel connected to ground. The output electrodes of the channels of FET's 40 and 42 are connected together to conductor 44 which is formed on the semiconductor chip. The conductor 44 forms an interim storage capacitor with the substrate, which is represented by the dotted capacitor 45. The conductor 44 is connected to the DATA bus 16 by a transmission gate 46, which is selectively rendered conducting to apply the potential at conductor 44 to the bus 16. The transmission gate 46 can be a single FET, but is illustrated as formed by complimentary FET's 48 and 49. FET 48 is of the P-type, and FET 49 is of the N-type, with the two being connected in parallel between conductor 44 and the DATA bus 16, to apply the potential on capacitor 45 to the DATA bus when the transmission gate 46 is conducting. The two opposite conductivity type FET's make it possible to apply the full voltage across the capacitor 45 to the bus 16.

Figure 2:
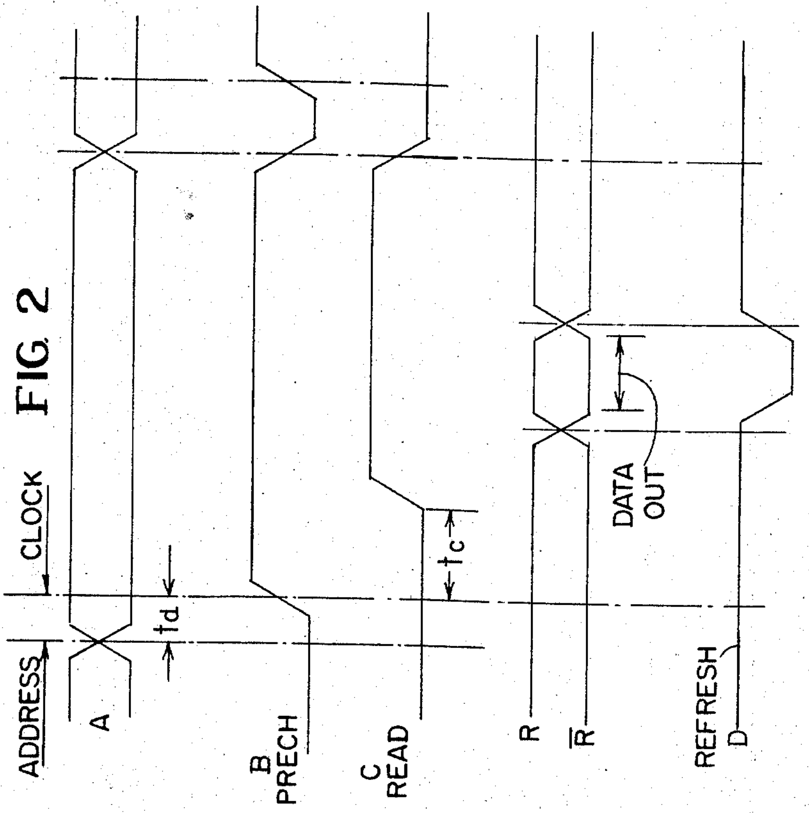
FIG. 2 is a timing diagram useful in connection with the operation of the circuit of FIG. 1.

FIG. 2 is a timing diagram which illustrates the operation of the refresh cycle of the circuit of FIG. 1. The clock pulses shown can be provided by known circuitry. Line A on FIG. 2 shows the address action which selects a particular cell in the memory. The precharge potential (PRECH) is applied by a clock to terminal 37 connected to the gate of FET 35, at a time $t_a$ following the address. As previously stated, this causes FET 35 to conduct so that the plus V potential of 5 volts is applied to the READ bus 18 to precharge the same. The potential on bus 18 is shown by line B in FIG. 2.

The potential shown by line C of FIG. 2 is applied to the CELL READ line 20, which is connected to the gate of FET 27. At a time after the READ bus 18 has charged ($t_c$ in FIG. 2), the potential on line 20 rises to cause FET 27 to conduct. Assuming that the cell 10 has a "1" stored therein, so that a positive voltage of the order of 5 volts is stored on capacitor 32 causing FET 26 to conduct, then when FET 27 conducts, the READ bus 18 will discharge through FET's 26 and 27 toward ground. When bus 18 discharges to a voltage of the order of 4.0 to 4.5 volts, depending on the threshold of the P-type FET 40, this device will conduct so that the positive voltage at terminal 36, which is connected to the channel thereof, is applied through the conducting channel to conductor 44 and is developed across the interim storage capacitor 45.

The charge developed on capacitor 45 will be applied through the transmission gate 46 when the FET's 48 and 49 thereof are rendered conducting. Opposite polarity trigger pulses are applied to terminals 50 and 51, which are connected to the gates 48 and 49 of these FET's to render the same conducting to complete the path through the transmission gate 46 to the DATA bus 16. These pulses are shown in FIG. 2, with the pulse designated $\overline{R}$ being applied to terminal 50 connected to the gate of the P-type FET 48, and the opposite phase pulse designated R being applied to terminal 51 connected to the gate of the N-type FET 49. The bit information is therefore available on the DATA bus 16 and can be read out therefrom during the time period indicated by the interval marked DATA OUT in FIG. 2.

Shortly after the transmission gate 46 is operated, and while the gate 46 remains conducting, the potential on the CELL WRITE line 22 will render the FET 25 of the cell 10 conducting. This timing is shown by the line D in FIG. 2. Accordingly, the voltage developed across capacitor 45 will be applied to the capacitor 32 of cell 10 to refresh the information bit stored therein. It is pointed out that at the initiation of the refresh cycle, the capacitor 32 may have discharged to a value somewhat below the initial value of +5 volts, but will still act to hold transistor 26 conducting. This potential is then brought up to the desired value by the refresh cycle. In the event that new information is to be read into the cell 10, this information will be applied after the transmission gate 46 has completed its conduction, and the DATA bus 16 is disconnected from the capacitor 45.

Considering the action when the information bit stored in cell 10 is a "0," the capacitor 32 will then be charged (discharged) substantially to zero volts. In such case, FET 26 will be nonconducting and there will be no conducting path between READ bus 18 and ground. The READ bus 18 will therefore remain at its precharged value or 5 volts. This will render the N-type FET 42 conducting to ground interim storage capacitor 45. When transmission gate 46 conducts, this ground or zero potential will be applied through the transmission gate to the DATA bus 16, to ground the same. As FET 25 of cell 10 is rendered conducting while transmission gate 46 conducts, the ground potential will be applied to capacitor 32. Accordingly, if the capacitor 32 has charged to a potential other than zero volts when the refresh cycle is initiated, it will be brought back to zero volts to refresh the "0" information bit stored by cell 10.

By use of the opposite conductivity type FET's 40 and 42, the information bit applied to bus 18 is read out more rapidly than if only one type FET device, as used in the cells, is used in the refresh circuit. As previously stated, the FET 40 will conduct when the potential on the READ bus drops only ½ volt, so that the potential at terminal 36 is applied to the capacitor 45. This results in rapid charge of the capacitor 45 in the refresh circuit, and the timing of the transmission gate 46 to apply the charge on capacitor 45 to the DATA bus 16 is less critical. The refresh circuit is also used when it is desired to read information from the memory, and the information can be rapidly derived from the DATA bus, which has the same information as the memory cell. This information can be read out and used to refresh the cell at the same time.

The refresh circuit of the invention has been found to provide extremely fast operation when used with a dynamic MOS random access memory having a low supply voltage, with the refresh cycle requiring a time of the order of 100 nanoseconds. In this circuit it is not necessary to precharge the DATA bus as both the +5 volt potential and ground potential on the interim capacitor of the refresh circuit are applied to the DATA bus and to the charge storage in the cell. This makes the timing of the various operations in the refresh cycle much less critical than in systems in which the DATA bus must be precharged.

I claim:

1. In a memory unit having a multiplicity of semiconductor cells each being adapted to store an information bit, with a bus connected to a plurality of cells for reading out the information thereon; a circuit for restoring the information in the cells including semiconductor means forming first and second gates of opposite conductivity types each having input, output and control electrodes, said semiconductor means also forming charge storage means coupled to said output electrodes of said gates, means for supplying first and second potentials to said input electrodes of said first and second gates respectively, means connecting the bus to said control electrodes of said gates for selectively rendering said first and second gates conducting to charge said charge storage means to one of said first and second potentials in accordance with the potential on the bus, and selectively operated means adapted to be coupled to the cells for applying the charge on said charge storage means to the cells for restoring the information therein.

2. A circuit in accordance with claim 1 wherein said first and second gates are formed by field-effect transistors of opposite conductivity types.

3. The circuit of claim 2 wherein said selectively operated means includes a transmission gate formed by a pair of field-effect transistors of opposite conductivity types connected in parallel to said charge storage means.

4. The circuit of claim 3 wherein all said field-effect transistors are provided on a single MOS chip with said semiconductor cells.

5. A circuit for restoring the information bits in the cells of a dynamic MOS random access memory having a multiplicity of semiconductor cells each including a plurality of field-effect transistors all of which are of the same conductivity type and charge storage means adapted to be selectively held at first and second potentials, with a first bus connected to a plurality of cells for setting the potentials thereon, and a second bus connected to the plurality of cells for reading out the potentials stored thereon; such restoring circuit including semiconductor means forming first and second gates of opposite conductivity types each having input, output and control electrodes, said semiconductor means also forming charge storage means coupled to said output electrodes of said gates, means for supplying the first and second potentials to said input electrodes of said first and second gates respectively, means connecting the second bus to said control electrodes of said gates for selectively rendering said first and second gates conducting to charge said charge storage means to one of said first and second potentials in accordance with the potential on the second bus, and selectively operated means for applying the charge on said charge storage means to the first bus.

6. The circuit of claim 5 further including a precharge circuit connected to the second bus for precharging the same to a given potential and means for actuating a selected cell, whereby such cell cooperates with said second bus for controlling the operation of said first and second gates.

7. The circuit of claim 6 wherein said first and second gates and said precharge circuit are formed by field-effect transistors provided as a single MOS chip with the semiconductor cells and the first and second buses connected thereto.

8. A memory unit including in combination, a multiplicity of semiconductor cells each having a plurality of field-effect transistors of the same conductivity type and first charge storage means adapted to be selectively held at first and second potentials, a first bus connected to a plurality of said cells for setting the potentials thereon, a second bus connected to the plurality of cells for reading out the potentials thereon, and a circuit for refreshing the potentials on said cells including semiconductor means forming first and second gates of opposite conductivity types each having input, output and control electrodes, said semiconductor means also forming second charge storage means coupled to said output electrodes of said gates, means for supplying the first and second potentials to said input electrodes of said first and second gates respectively, means connecting said second bus to said control electrodes of said gates for selectively rendering said first and second gates conducting to charge said second charge storage means to one of said first and second potentials, and selectively operated means for applying the potential on said second charge storage means to said first bus.

9. A memory unit in accordance with claim 8 further including a precharge circuit connected to said second bus for precharging the same to a given potential, and circuit means connected to said cells for selectively operating the same to discharge said second bus and control the conductivity of said first and second gates.

10. A memory unit in accordance with claim 9 wherein each of said cells has means selectively operated to apply the potential on said first bus to said first storage means thereof.

11. A memory unit in accordance with claim 10 wherein said first and second gates are formed by field-effect transistors of opposite conductivity types, and said selectively operated means is formed by a pair of field-effect transistors of opposite conductivity types connected in parallel between said charge storage means and said first bus.

12. A memory unit in accordance with claim 11 wherein said cells, said first and second buses, said refreshing circuit, said precharge circuit and said circuit means are formed on a single MOS chip.

* * * * *